(12) United States Patent
Forster

(10) Patent No.: US 11,900,204 B2
(45) Date of Patent: Feb. 13, 2024

(54) OBJECT LOCATION SYSTEM AND METHOD USING RFID AND GUARD TAGS

(71) Applicant: Avery Dennison Retail Information Services LLC, Mentor, OH (US)

(72) Inventor: Ian Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 44 days.

(21) Appl. No.: 17/630,280

(22) PCT Filed: Jul. 27, 2020

(86) PCT No.: PCT/US2020/043704
§ 371 (c)(1),
(2) Date: Jan. 26, 2022

(87) PCT Pub. No.: WO2021/021712
PCT Pub. Date: Feb. 4, 2021

(65) Prior Publication Data
US 2022/0277152 A1   Sep. 1, 2022

Related U.S. Application Data

(60) Provisional application No. 62/878,961, filed on Jul. 26, 2019.

(51) Int. Cl.
*G06K 7/10* (2006.01)
*G06K 19/073* (2006.01)

(52) U.S. Cl.
CPC ... *G06K 7/10366* (2013.01); *G06K 19/07327* (2013.01)

(58) Field of Classification Search
CPC .............. G06K 7/10366; G06K 19/07327
See application file for complete search history.

(56) References Cited

U.S. PATENT DOCUMENTS

| 6,542,114 B1 | 4/2003 | Eagleson et al. |
| 7,667,575 B2 | 2/2010 | Husak et al. |

(Continued)

FOREIGN PATENT DOCUMENTS

| JP | 11-130213 | 5/1999 |
| JP | 2000-048270 | 2/2000 |

OTHER PUBLICATIONS

International Preliminary Report on Patentability dated Feb. 1, 2022 issued in corresponding IA No. PCT/US2020/043704 filed Jul. 27, 2020.

(Continued)

*Primary Examiner* — Jamara A Franklin

(57) ABSTRACT

A system for locating a RFID tag in a space or area having a physical barrier is disclosed herein. More specifically, the system comprises a plurality of guard tags for use in conjunction with a RFID tag disposed on an item and a RFID reader for locating the same. The system is configured to locate the RFID tag on either side of the physical barrier. The plurality of guard tags may comprise a plurality of negative encoded guard tags and a plurality of positive encoded guard tags, and an algorithm may be used to determine a probability of the RFID tag location within the physical space. A method of locating a RFID tag within a physical space, and a method of virtually shielding the physical space is also disclosed.

13 Claims, 3 Drawing Sheets

(56) References Cited

U.S. PATENT DOCUMENTS

| | | |
|---|---|---|
| 8,672,222 B2 | 3/2014 | Forster |
| 9,449,202 B2 | 9/2016 | Clare et al. |
| 10,585,159 B2 | 3/2020 | Sadr et al. |
| 2003/0156493 A1 | 8/2003 | Bayer |
| 2005/0052281 A1 | 3/2005 | Bann |
| 2006/0033609 A1 | 2/2006 | Bridgelall |
| 2006/0273176 A1* | 12/2006 | Audebert .......... G06K 19/07336 235/451 |
| 2008/0100446 A1 | 5/2008 | Shintani |
| 2008/0211633 A1* | 9/2008 | Oh .................... G06Q 10/06 340/10.1 |
| 2009/0315679 A1 | 12/2009 | Bauchot et al. |
| 2011/0163916 A1 | 7/2011 | Bamidele |
| 2011/0266342 A1 | 11/2011 | Forster |
| 2013/0169417 A1* | 7/2013 | Sugano ............. G06K 7/10108 340/10.1 |
| 2016/0152350 A1 | 6/2016 | Puentes et al. |
| 2016/0370454 A1 | 12/2016 | Raynesford et al. |
| 2017/0053505 A1 | 2/2017 | Lauria et al. |
| 2017/0293014 A1 | 10/2017 | Forster |
| 2018/0157872 A1 | 6/2018 | Forster |
| 2019/0235069 A1 | 8/2019 | Shaorinejad et al. |

OTHER PUBLICATIONS

International Search Report and Written Opinion dated Nov. 4, 2020 issued in corresponding IA No. PCT/US2020/043704 filed Jul. 27, 2020.

* cited by examiner

OBJECT LOCATION SYSTEM AND METHOD USING RFID AND GUARD TAGS

CROSS-REFERENCE TO RELATED APPLICATION(S)

The present application is a 371 of International Application No. PCT/US2020/043704, which was published in English on Feb. 4, 2021, and claims the benefit of U.S. Provisional Patent Application No. 62/878,961 filed Jul. 26, 2019, both of which are incorporated herein by reference in their entireties.

FIELD

The present invention relates generally to a system for locating radio frequency identification (RFID) tags with the use of a plurality of guard tags. More specifically, the present invention discloses a system for locating a RFID tag in a space or area containing at least one physical barrier, wherein the system contains a plurality of guard tags for use in conjunction with a RFID tag disposed on an article to be located, and a RFID reader for locating the RFID tagged article. The system is configured to locate the RFID tagged article on either side of the physical barrier, and the plurality of guard tags serve to provide RF shielding to the area and may comprise a plurality of negative encoded guard tags and a plurality of positive encoded guard tags. Further, an algorithm may be used to determine the probability of the RFID tag location within the area.

BACKGROUND

Generally stated, radio-frequency identification is the use of electromagnetic energy to stimulate a responsive device (known as an RFID "tag" or transponder) to identify itself and, in some cases, provide additional information and/or data stored in the tag. RFID tags typically include a semiconductor device commonly referred to as the "chip", upon which are formed a memory and an operating circuitry, which is connected to an antenna. Typically, RFID tags act as transponders, providing information stored in the chip memory in response to a radio frequency interrogation signal received from a reader, also referred to as an interrogator. In the case of passive RFID devices, the energy of the interrogation signal also provides the necessary energy to operate the RFID tag device.

RFID tags may be incorporated into or attached to articles that a user wishes to later identify and/or track. In some cases, the tag may be attached to the outside of the article with a clip, adhesive, tape, or other means and, in other cases, the RFID tag may be inserted within the article, such as being included in the packaging, located within the container of the article, or sewn into a garment or footwear. Further, RFID tags are manufactured with a unique identification number which is typically a simple serial number of a few bytes with a check digit attached. This identification number is typically incorporated into the RFID tag during its manufacture. The user cannot alter this serial/identification number, and manufacturers guarantee that each RFID tag serial number is used only once and is, therefore, unique. Such read-only RFID tags typically are permanently attached to an article to be identified and/or tracked and, once attached, the serial number of the tag is associated with its host article in a database, such as a locally hosted database, a cloud-based database, and/or a distributed ledger.

As referenced above, RFID tags are generally formed by connecting an RFID chip to some form of antenna. Antenna types are very diverse, as are the methods of constructing the same. One particularly advantageous method of making RFID tags is to use a strap, a small device with an RFID chip connected to two or more conductors that can be coupled to an antenna. The coupling of the conductors to the antenna can be achieved using a conductive connection, an electric field connection, magnetic connection or a combination of coupling methods.

Typically, an item can be affixed with a specific RFID tag unique to the item. The RFID reader can then be employed to read the RFID tag to determine if a particular item is amongst a larger group of items. For example, in a product tracking scenario, unique RFID tags may be affixed to a number of products. A user looking for a particular product may use a RFID reader to communicate with that product's unique RFID tag. More specifically, the RFID reader is capable of determining whether the sought after product is present in a particular area.

However, while RFID tags may be used to indicate the presence of a specific article amongst a number of articles, the specific article must still be physically located. For example, even if the RFID reader detects the presence of a particular article in an area, a person must still take the time to sort through the area to determine the article's exact location within the area. This can be especially difficult in large retail spaces, or wherein the various articles are located in different areas separated or partitioned by physical barriers, such as walls, floors, partitions and the like, particularly because RFID signals are capable of penetrating solid barriers, such as walls, floors, partitions, etc., depending on the strength of the RFID signal. Therefore, determining whether a RFID tag, and the associated article or item to which it is attached, is located on the floor of a retail store, or back in inventory can be both challenging and time consuming.

In lieu of conducting manual searches for an article, other semi-automated solutions have been developed, but those solutions rely on the presence of physical barriers (e.g., walls, floors, partitions and the like) so that the search could be limited to only one confined area or space at a time. However, because RFID signals can typically penetrate such physical barriers, additional physical or electromagnetic shielding has to be employed to prevent unwanted RFID signal transmission. Electromagnetic shielding is the practice of reducing the electromagnetic field in a space by blocking the field with barriers made of conductive or magnetic materials. Electromagnetic shielding that blocks radio frequency electromagnetic radiation is also known as RF shielding. RF shielding can reduce the coupling of RF waves, electromagnetic fields, and electrostatic fields. The amount of reduction is directly related to the shielding material used, its thickness, the size of the shielded volume and the frequency of the fields of interest and the size, shape and orientation of apertures in a shield to an incident electromagnetic field.

Typical materials used for electromagnetic shielding include sheet metal, metal screen, and metal foam. However, each these are expensive to procure and time consuming to install. Further, any holes or openings in the electromagnetic shielding or mesh must be significantly smaller than the wavelength of the radiation that is being blocked, or the electromagnetic shielding will not function effectively or approximate an unbroken conducting surface. Copper is typically used for radio frequency shielding because it is capable of absorbing both radio and electromagnetic waves, but is also relatively expensive. Electromagnetic or physical shielding, such as metal foils or metallic paints, can be installed or applied to traditional barriers. Unfortunately, as noted above, these solutions are expensive, and time consuming to install. Additionally, misapplication or incomplete coverage of the physical shielding can still permit RF signal leakage through the walls, thereby rendering the shielding ineffective.

Another potential solution has been to use virtual shielding to assist in determining the location of the RFID tag and the item to which it is attached. Virtual shielding uses the RFID tag's received signal strength indication (RSSI) to indicate a particular RFID tag's proximity to a RFID reader. For example, a RFID tag that is relatively close to a RFID reader will exhibit a higher RSSI reading. In comparison, a RFID tag that is relatively far away from a RFID reader will typically exhibit a lower RSSI reading. More specifically, as the distance between the RFID reader and the RFID tag increases, the signal gets weaker and the wireless data rates get slower, thereby leading to a lower overall data throughput. Unfortunately, current virtual shielding systems are oftentimes "fooled" by physical barriers, such as walls, floors, partitions, etc., with relatively low adsorption, and/or the presence of strong RFID tags and are, therefore, not particularly effective.

Consequently, there is a long felt need in the art for an RFID system which more accurately locates items or products with a RFID tag attached thereto in an area, such as a retail space. Further, there also exists in the art a long felt need for a method of determining the location of an item or product with a RFID tag attached thereto in an area having one or more physical barriers (e.g., walls, floors, partitions, etc.) without the need for traditional RFID physical shielding, which can be both relatively time consuming and expensive to install. Additionally, there exists in the art a long felt need for a method of virtually RF shielding an area that overcomes the limitations described above.

The RFID system described herein creates a more effective form of virtual shielding that eliminates or substantially reduces the problems typically associated with traditional physical shielding, thereby making it easier and more cost effective for a user to locate a RFID tagged product or item in, for example, a traditional retail space wherein products are located throughout the retail space, such as both on the sales floors and in an inventory or back room.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some concepts in a simplified form as a prelude to the more detailed description that is presented later.

Systems for locating an item with an RFID tag attached thereto in an area that may be segregated by one or more physical barriers, such as walls, floors, ceilings, partitions and the like is described herein. In some embodiments, the system contains an RFID tag disposed on a product or object, a RFID reader for communicating with the RFID tag within an area, and a plurality of guard tags disposed within the area in which the RFID tag is located. At least one of the plurality of guard tags may be a negative tag encoded with a location flag and having a relatively high weight, and at least one of the plurality of guard tags may be a positive tag encoded with a location flag and having a relatively medium weight, or a weight that is less than that of the negative guard tags. The negative guard tag(s) are coded to not be read by the RFID reader, while the positive guard tag(s) are coded to be read by the RFID reader. The RFID systems described herein is deployable within an area or location, including those having at least one physical barrier, and the RFID reader is capable of accurately locating the RFID tag on either side of the physical barrier.

Methods of locating an object or item with a RFID tag attached thereto in an area comprising at least one physical barrier (e.g., walls, floors, ceilings, partitions and the like) are also disclosed. In some embodiments, the method includes: (a) associating an RFID tag with an item or object to be located or tracked within a physical area having at least one physical barrier; (b) deploying a plurality of guard tags within the physical area having at least one barrier; and (c) transmitting a RFID signal from a RFID reader to the RFID tag to locate the RFID tag within the physical area. The method may further include the additional steps of assessing the positioning of the plurality of guard tags within the physical area to maximize the RF shielding of the physical area, and/or using an algorithm to determine a probability of the RFID tag location within the physical area. At least one of the plurality of guard tags is preferably a negative guard tag with a location flag and a relatively high weight, and at least one of the plurality of guard tags is preferably a positive guard tag with a location flag and having a weight that is less than the weight of the negative guard tag.

Methods of virtually shielding a physical area having at least one physical barrier (e.g., walls, floors, ceilings, partitions and the like) are also disclosed. In some embodiments, the method includes: (a) assessing a need for RF shielding a physical area having at least one barrier; (b) deploying a plurality of guard tags to RF shield the physical area; and (c) transmitting a RF signal from a RFID reader to a RFID tag to locate the RFID tag within the physical area and to confirm the RF shielding of the physical area. In some embodiments, at least one of the plurality of guard tags is preferably a negative guard tag with a location flag and a relatively high weight, and at least one of the plurality of guard tags is preferably a positive guard tag with a location flag and having a weight that is less than the weight of the negative guard tag. The method may further include the step of assessing where to position the high weight negative guard tag and/or the lesser weight positive guard tag with respect to the RFID tag to maximize the benefits of the RF shielding and to improve location accuracy.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and is intended to include all such aspects and their equivalents. Other advantages and novel features will become apparent from the following detailed description when considered in conjunction with the drawings.

DETAILED DESCRIPTION

Figure 1:
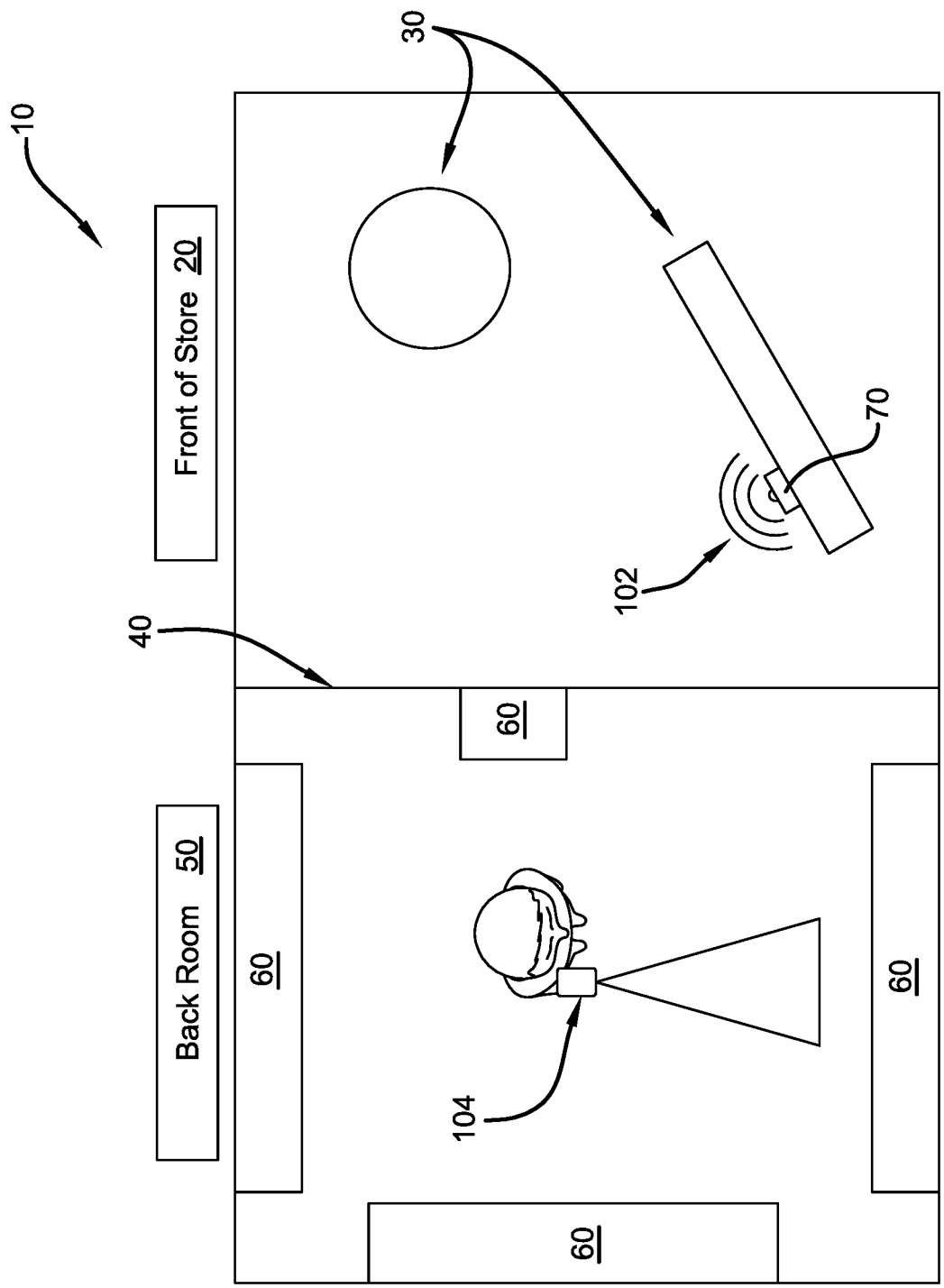
FIG. 1 illustrates an overhead plan view of a user using a RFID reader within a physical area containing at least one physical barrier to locate a RFID tag, and that has a relatively low probability of locating a RFID tag within said physical area because the RFID reader is being pointed away from the RFID tag.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof.

Articles, such as retail items being offered for sale in a retail store location or in inventory in a shop or warehouse, are often tagged with a RFID tag for locating and/or tracking purposes. In some cases, the RFID tag may be attached to the outside of the article with a clip, adhesive, tape, hangtag, or other means and, in other cases, the RFID tag may be inserted within the article, such as being included in the packaging, located within the container of the article, or sewn into a garment. A RFID interrogator or reader may then be used to locate or track the article by transmitting electromagnetic energy to stimulate and/or instruct the RFID tag to identify itself and, in some cases, provide additional information and/or data stored in the RFID tag. More specifically, the stimulated RFID tags act as transponders, providing information stored in the chip memory in response to the radio frequency interrogation signal received from the RFID reader. The RFID tag may be active or passive. Active RFID tags are battery powered and capable of providing a very strong signal. In the case of passive RFID tags, the energy of the interrogation signal from the RFID reader also provides the necessary energy to operate the RFID tag.

As noted above, retail businesses often employ RFID tags to track inventory between the stock room and the shop floor, as it is advantageous for these businesses to have an accurate accounting of inventory and where it is located. As customers purchase the items, a proper accounting allows the business to restock the retail area in a timely and efficient manner. Similarly, the businesses will be able to accurately determine the number of items in reserve in the stock room, or other storage areas, so that they do not run out of items, or order unnecessary inventory and have to store the same for prolonged periods of time, which is not only inefficient but expensive in a retail setting.

While RFID tags are extremely useful in tracking total inventory in a space, locating specific RFID tags among multitudes of tagged items can be both challenging and time consuming. As radio frequency signals typically penetrate the low adsorption construction of most physical barriers used in retail locations and shops (such as walls, ceilings, floors, partitions and the like), the actual physical location of a particular item can be difficult to ascertain. This is especially true in retail spaces with additional physical barriers such as shelving, changing rooms, etc. For example, many retail locations include a physical area having many of the previously mentioned barriers, in addition to a retail shop floor or exhibition area for displaying merchandise to customers and a back storage or stock room area for holding merchandise in reserve.

Turning now to the drawings, FIG. 1 illustrates an overhead plan view of a user using a RFID reader 104 within a physical area or space 10 containing at least one physical barrier 40 to locate a RFID tag 102, and that has a relatively low probability of locating a RFID tag within said physical space because the RFID reader is being pointed in a direction away from the RFID tag 102. Physical space 10 may include a retail space, a shop, a store, a warehouse, or the like. Accordingly, the present specification makes specific reference thereto. However, it will be appreciated by those of ordinary skill in the art that aspects of the present invention are also equally amenable to other like applications and devices.

Physical area or space 10 includes a front room or front of the store 20, such as a display area or a shop floor for displaying merchandise or other items in a plurality of display areas 30, such as racks, shelving, display cases, or the like. The physical space 10 may also further include a back room 50, such as a storage area, a warehouse, a stock room, or the like. The back room 50 may further contain a plurality of storage areas 60, such as shelves, racks, bins, etc., for retaining merchandise in reserve. Finally, the physical space 10 may further include at least one physical barrier, such as wall 40 that separates front room 20 from back room 50 and that may contain common building materials such as wood, metal, drywall, plaster, insulation and the like. As previously mentioned, such common building materials are relatively easily penetrated by radio frequency signals, therefore making it difficult to accurately and efficiently locate an article or object with an RFID tag 102 attached thereto without some means of effective RF shielding, and the use of physical RF shielding can be both expensive to procure and time consuming to install.

To locate an article 70, such as salable merchandise, within physical space 10, an employee, business owner or other user typically uses a RFID reader 104, such as a hand held scanner to scan an area of the space 10 to locate the article 70 using RFID tag received signal strength indication (RSSI) to determine if the RFID tag 102 is in relatively close proximity to the RFID reader 104, or if it is a further distance away. For example, and as best illustrated in FIG. 1, if the user is in the back room 50 of physical space 10 with the RFID reader 104 pointed in the general direction of one of the plurality of storage areas 60, there is a relatively high probability of locating the article 70 if it is directly in front of the RFID reader 104 (e.g., positioned on one of the plurality of storage areas 60). On the other hand, the probability of locating the article 70 decreases significantly if the RFID reader 104 is directed away from article 70 and its associated RFID tag 102, or if article 70 is in another room, such as front room 20, or otherwise physically separated from RFID reader 104 by a barrier such as wall 40, as best shown in FIG. 1.

Figure 2:
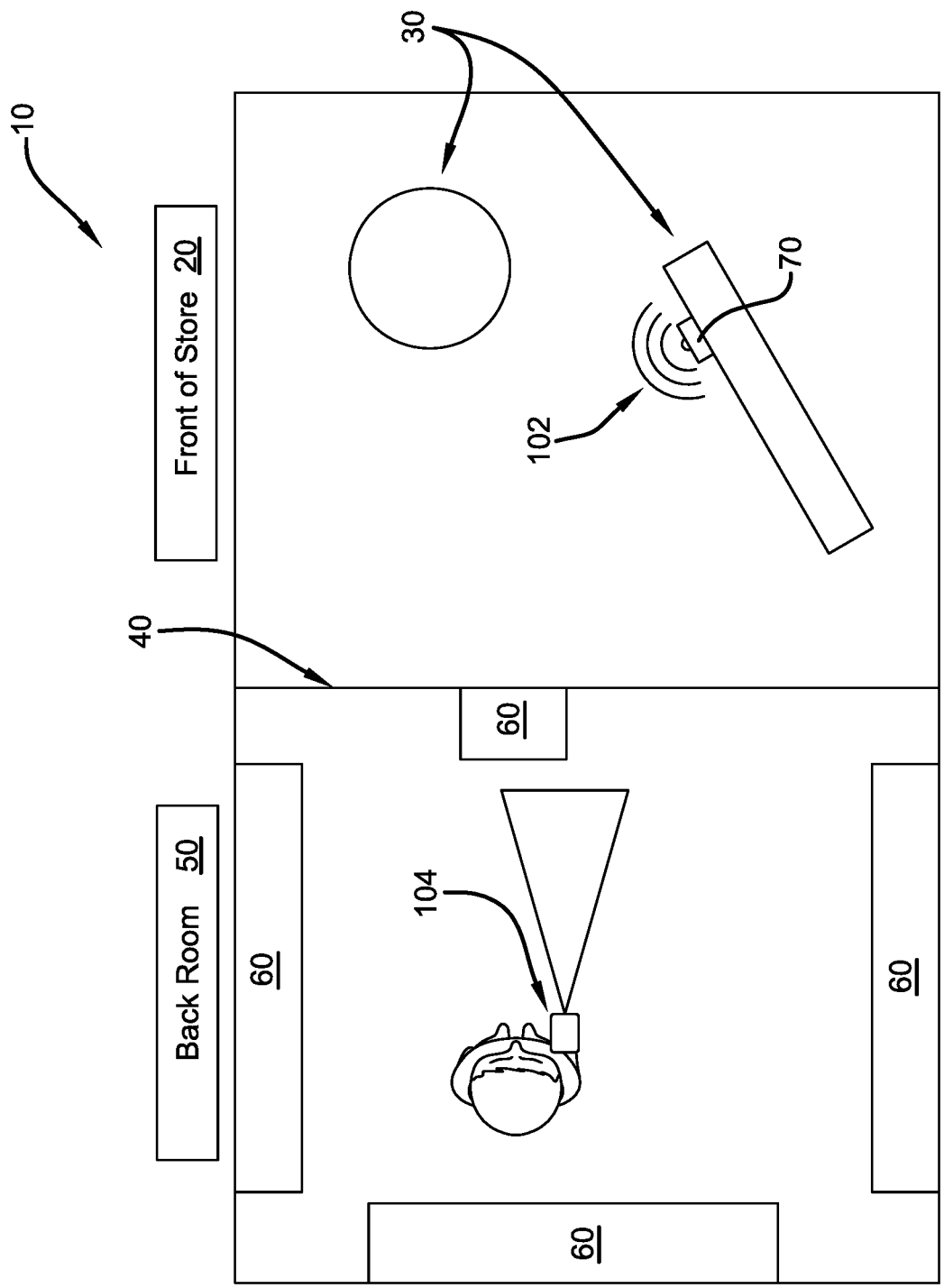
FIG. 2 illustrates an overhead plan view of a user using a RFID reader within a physical area containing at least one physical barrier to locate a RFID tag, and that has a relatively higher probability of locating a RFID tag within said physical area because the RFID reader is being pointed in the general direction of the RFID tag.

FIG. 2 illustrates an overhead plan view of a user using a RFID reader 104 within a physical area 10 containing at least one physical barrier 40 to locate a RFID tag 102, wherein the RFID reader 104 is being pointed in the general direction of the RFID tag 102. More specifically and similarly to FIG. 1, physical area or space 10 includes a front room 20 having a plurality of display areas 30 (e.g., racks, shelving, display cases, or the like) for displaying articles of merchandise 70 being offered for sale with a RFID tag 102 attached thereto, and a back room 50 having a plurality of storage areas 60 for retaining merchandise in reserve. The physical space 10 further includes at least one physical barrier, such as wall 40 that separates front room 20 from back room 50 and that may contain common building materials such as wood, metal, drywall, plaster, insulation and the like.

To locate article 70 within physical space 10, an employee or business owner may use a RFID reader 104, such as a hand held scanner to scan an area of the space 10 to locate the article 70 using RFID tag received signal strength indication (RSSI) to determine if the RFID tag 102 is in relatively close proximity to the RFID reader 104, or if it is a further distance away. For example, and as best illustrated in FIG. 2, if the user is in the back room 50 of physical space 10 with the RFID reader 104 pointed in the general direction of article 70 with RFID tag 102 attached thereto, there is a relatively high probability of locating the article 70 even if the two spaces, namely front of store 20 and back room 50, are separated by a physical barrier, such as wall 40.

The system and methods described herein help to alleviate or reduce the need to have the RFID reader 104 pointed directly at the article 70 (with RFID tag 102 attached thereto) to successfully identify the article 70, and its precise location within a physical space. More specifically, FIG. 3 generally illustrates an area or space 10 that may be virtually RF shielded by a plurality of guard tags 106 to improve the accuracy of locating a RFID tag 102 positioned somewhere within the space 10, even if the space 10 contains one or more barriers, such as wall 40.

In one embodiment system 100 for locating an RFID tag 102 is described. The system 100 contains an RFID tag 102 attachable to or otherwise disposed on or in an item or article 70 to be located and/or tracked, and a RFID reader 104 in wireless communication with the RFID tag 102. The RFID reader 104 may be configured as a handheld and phased array/multiple read point unit, such as the type manufactured and sold by Avery Dennison Corporation of Pasadena, California RFID reader 104 may be located in a back room 50 of space 10, and capable of reading RFID tags 102 attached to articles of merchandise 70 located in a front room 20. The system 100 further contains a plurality of guard tags 106 located throughout space 10 and in wireless communication with the RFID reader 104 to provide location filtering enhancement, as physical shielding is expensive and structural barriers, such as a physical barrier wall 40, positioned between the front of the store 20 and the back room 50 cannot be accurately relied upon to provide effective RF shielding.

More specifically, the system 100 utilizes the plurality of spaced apart and strategically positioned guard tags 106 to create a more effective virtual RF shielding than is currently available through the use of physical barriers and/or electromagnetic shielding materials, such as copper, sheet metal, metal screen, and metal foam, each of which can be expensive to purchase and time consuming to install. Further, the virtual RF shielding created by the use of positive and negative guard tags 106 eliminates or significantly reduces the problems historically associated with any holes or openings in the physical electromagnetic shielding materials of the prior art discussed supra.

Figure 3:
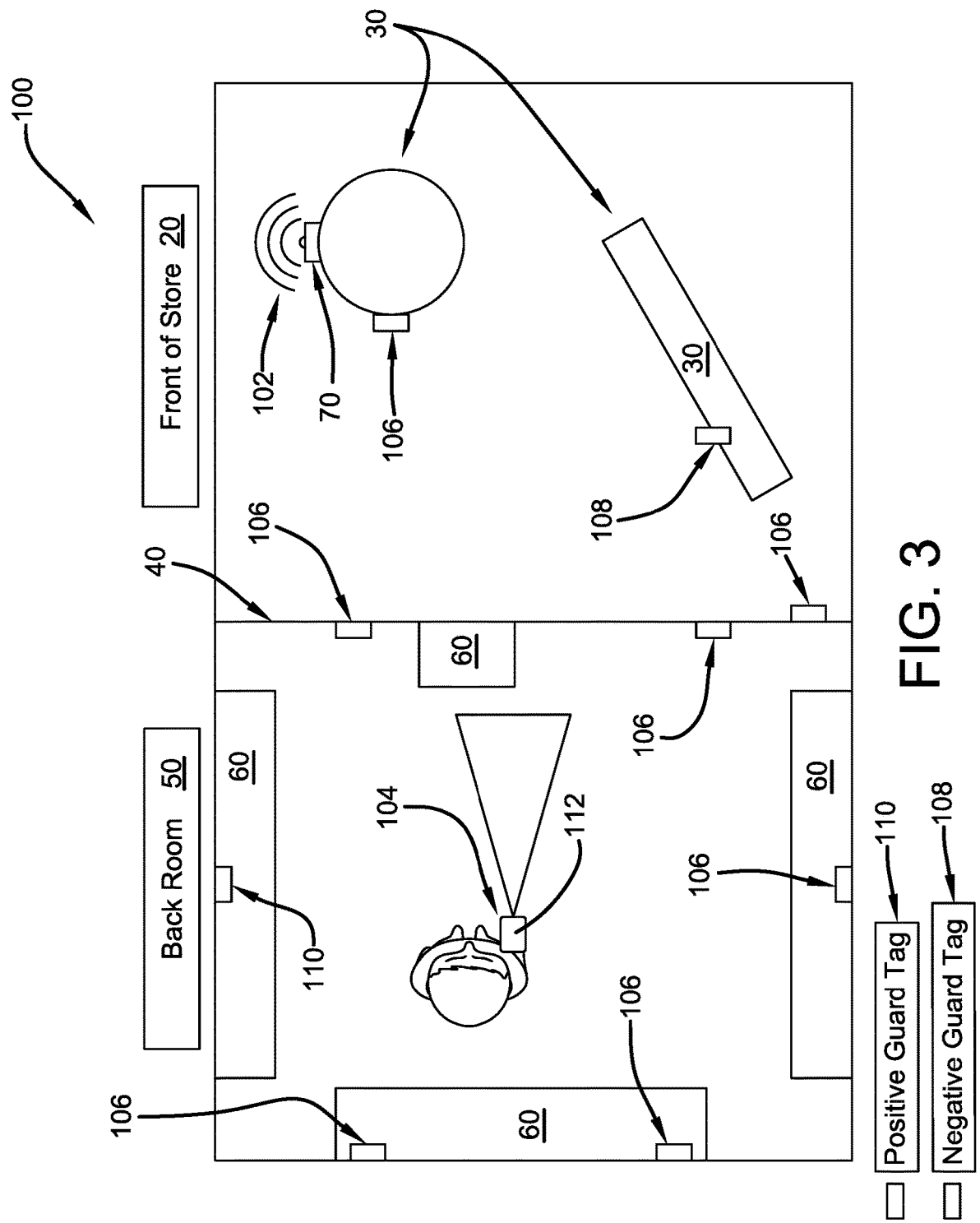
FIG. 3 illustrates an overhead plan view of a user using a RFID reader within a physical area containing at least one physical barrier and a plurality of guard tags to locate a RFID tag, and that has a relatively higher probability of locating a RFID tag within said physical area in accordance with the disclosed architecture.

The virtual RF shielding also enables the retailer, shop owner or other user to determine the location of a RFID tag 102 from a different location within physical space 10 (i.e., a different room or sub-space), such as the back room 50. The plurality of guard tags 106 may include at least one negative guard tag 108, and/or at least one positive guard tag 110. Each of the plurality of guard tags 106 is locatable throughout the space 10, preferably in spaced apart orientation as best shown in FIG. 3. For example, the guard tags 106 may be located on or affixed to walls, the ceiling or shelving 60 in the back room 50, and deployable on the physical barrier or wall 40. Additional guard tags 106 may be located on or affixed to other walls, the ceiling, the floor or other structures, such as racks/display units 30 in the front of store 20. Further, depending on how each of the plurality of guard tags 106 is being read or not being read by the RFID reader 104, it is possible to assign a probability of a particular RFID tag 102 (and the article 70 to which it is attached) being located in the back room 50 or the front of the store 20.

Each of RFID tags 102 and guard tags 106 may be active or passive in nature and include labels and inlays, such as those commonly manufactured and sold by Avery Dennison Corporation of Pasadena, California. As the guard tags 106 are effectively standard labels, or low cost metal tags, such as, but not limited to, AD460 or AD454 tags, or the like, the RFID guard tags 106 may be easily stuck to walls or other structures within physical space 10. Low cost on-metal tags, such as the AD460 RFID tags, are desirable as they reduce reflection effects, and permit relatively easy mounting in a store and stock room without the need for additional mounting materials, hardware, and/or tools. Further, the number of RFID guard tags 106 used and their strategic placement within physical space 10 will help boost the location determination probability that a particular RFID tag 102 (and the article 70 to which it is attached) will be identified and located by RFID reader system 104 within physical space 10.

Additionally, each of the plurality of guard tags 106 may be encoded with a location/direction flag, a weighting (e.g., shop floor tags may have a higher weight than that which is assigned to a wall tag), RSSI level at threshold, sensitivity, etc. The weight or weighting RSSI level at threshold is based on whether the particular guard tag 106 is a negative tag 108 or a positive tag 110. The plurality of guard tags 106 is deployable to shield the physical space 10. Typically, the negative guard tags 108 have relatively higher weights, and are preferably deployed in the shop floor or front of the store 20. Conversely, the positive guard tags 110 have medium weights (or weights less than the negative guard tags 108), and are preferably deployed in the stock or back room 50. Additionally, each of the plurality of guard tags 106 may include a visual indicator, such as a color coding or other physical marking that enables an installer of the guard tags 106 to easily differentiate between the negative guard tags 110 and the positive guard tags 110 during the installation process.

In other embodiments, a method of virtually shielding a physical area 10 having at least one physical barrier 40 (e.g., walls, floors, ceilings, partitions and the like) is disclosed. Generally stated, the method includes the following steps: (a) assessing a need for RF shielding a physical area 10 having at least one barrier 40; (b) deploying a plurality of guard tags 106 to RF shield the physical area 10; and (c) transmitting a RF signal from a RFID reader 104 to a RFID tag 102 to locate the RFID tag 102 within the physical area 10 and to confirm the RF shielding of the physical area 10. At least one of the plurality of guard tags 106 is preferably a negative guard tag 108 with a location flag and a relatively high weight, and at least one of the plurality of guard tags 106 is preferably a positive guard tag 110 with a location flag and having a weight that is preferably less than the weight of the negative guard tag 108.

The number of guard tags 106 that need to be deployed may vary depending on the existing and/or natural RF shielding of the space 10, such as physical barriers 40 that may provide some degree of RF shielding between a back room 50 and a shop floor or front of the store 20. For example, if adequate natural or existing RF shielding already exists, no guard tags 106 may be required. On the other hand, if little to no existing or natural RF shielding exists, several guard tags 106 may need to be placed throughout the space 10 (e.g., on walls, ceilings, fixtures, etc.).

The method of virtually RF shielding a physical area 10 may further include assessing where to position the high weight negative guard tags 108 and/or the lesser weight positive guard tags 110 with respect to the RFID tag 102 to maximize the benefits of the RF shielding, and to improve location accuracy. In one example of assessing where to place the plurality of guard tags 106, an installer may elect to place a negative guard tag 108 in the front of the store 10 at a location that is relatively near to the article 70 to be tracked or located in the future.

In still other embodiments, a method of locating an object or article 70 with a RFID tag 102 attached thereto in an area 10 including at least one physical barrier 40 (e.g., walls, floors, ceilings, partitions and the like) is disclosed. In some embodiments, the method includes: (a) associating an RFID tag 102 with an item or article 70 to be located or tracked within a physical area 10 having at least one physical barrier 40; (b) deploying a plurality of guard tags 106 within the physical area 10 having at least one barrier 40; and (c) transmitting a RFID signal from a RFID reader 104 to the RFID tag 102 to locate the RFID tag 102 within the physical area 10. The deployment of the plurality of guard tags 106 within the space 10 creates a virtual RF shielding effect that is more effective and efficient than the physical RF shielding of the prior art.

The method may further include assessing the positioning of the plurality of guard tags 106 within the physical area 10 to maximize the shielding of the physical area 10, and/or using an algorithm to determine a probability of the RFID tag 102 location within the physical area 10. At least one of the plurality of guard tags 106 is preferably a negative guard tag 108 with a location flag and a relatively high weight, and at least one of the plurality of guard tags 106 is preferably a positive guard tag 110 with a location flag and having a weight that is less than the weight of the negative guard tag 108.

For example, hand held RFID reader 104 can be used to read guard tags 106, assess the amount of RF penetration within space 10 and recommend a label deployment. The method may further include using an algorithm 112 to determine the probability of the location of the RFID tag 102 within the space. In one embodiment, the probability of the RFID tag 102 being in either the front room 20 or the back room 50 can be determined by the following algorithm 112, with various inputs possible. For example:

If $P_L$=the probability that a particular RFID tag 102 is located in the back room 50; and If $T_W$=Tag weight (RSSI, Read Rate, Tag sensitivity), then $P_L$=Product tag ($T_W$)–Guard tag ($T_W$).

So, if the $T_W$ of the RFID tag 102 for the item 70 is high, and the $T_W$ of the guard tag 106 is low (e.g., the RFID reader 104 is not pointing toward the front room 20 or attenuation from the infrastructure is high), the probability of the RFID tag 102 being in the back room 50 is high.

Conversely, if the $T_W$ of the RFID tag 102 for the item 70 is medium or low, and the $T_W$ of the guard tag 106 is high (e.g., the RFID reader 104 is pointing toward the front room 20 or attenuation from the infrastructure is high), the probability of the RFID tag 102 being in the back room 50 is low. Additionally, data gathered by the RFID reader 104 can also be sent to a host for post processing, or, for example, if the guard tag 106 being read is on the shop floor in the front room 20, the user may reduce the RFID reader 104 output power until the RFID reader 104 stops reading. For a particular RFID tag 102, the probability may be an integral over time, given that the RFID reader 104 is being moved about.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for locating a radio frequency identification (RFID) tag in an area comprising:
    an RFID tag disposed on an article in the area that accommodates a plurality of articles and respective RFID tags, wherein the RFID tag includes a weight associated with a received signal strength indication of the RFID tag;
    an RFID reader in communication with the RFID tag; and
    a plurality of guard tags, each guard tag having a weight, the weight being based on a received signal strength indication of the guard tag and positioned in the area;
    wherein:
    at least one of the guard tags is a positive guard tag and at least one of the guard tags is a negative guard tag,
    the weight of the negative guard tag is higher than the weight of the positive guard tag; and
    a probability of a location of the RFID tag is determined based on the weight of the guard tags when compared with the weight of the RFID tag,
    wherein the plurality of guard tags is deployable to provide RF shielding to the area.

2. The system of claim 1, wherein the RFID reader is in wireless communication with the RFID tag and at least one of the plurality of guard tags.

3. The system of claim 1, wherein each of the plurality of guard tags is encoded with a location flag.

4. The system of claim 1, wherein each of the plurality of guard tags comprises a visual indicator.

5. The system of claim 1, wherein the area comprises at least one physical barrier.

6. A method of locating an RFID tag within an area comprising:
    associating the RFID tag with an article positioned in the area, wherein the area accommodates a plurality of articles and respective RFID tags, wherein the RFID tag includes a weight associated with a received signal strength indication of the RFID tag;
    deploying a plurality of guard tags within the area to provide RF shielding in the area, each guard tag having a weight being based on a received signal strength indication of the guard tag, wherein at least one of the guard tags is a positive guard tag and at least one of the guard tags is a negative guard tag, and the weight of the negative guard tag is higher than the weight of the positive guard tag;

comparing the weight of the guard tags with the weight of the RFID tags;

determine a probability of a location of the RFID tag being based on the weight of the guard tags when compared with the weight of the RFID tag; and transmitting a signal from a RFID reader to the RFID tag to locate the RFID tag within the area.

7. The method of claim 6, wherein there is at least one physical barrier located within the area.

8. The method of claim 6 further comprising the step of assessing a positioning of the plurality of guard tags to maximize the RF shielding of the area.

9. The method of claim 6, further comprising the step of using an algorithm to determine a probability of the RFID tag location within the area.

10. A method virtually RF shielding an area comprising:

assessing a need for RF shielding the area that accommodates a plurality of articles and respective RFID tags, wherein the RFID tag includes a weight associated with a received signal strength indication of the RFID tag;

deploying a plurality of guard tags within the area to RF shield the area, each guard tag having a weight being based on a received signal strength indication of the guard tag, wherein at least one of the guard tags is a positive guard tag and at least one of the guard tags is a negative guard tag, and the weight of the negative guard tag is higher than the weight of the positive guard tag;

comparing the weight of the guard tags with the weight of the RFID tags;

determine a probability of a location of the RFID tag being based on the weight of the guard tags when compared with the weight of the RFID tag; and transmitting a RF signal from a RFID reader to a RFID tag to locate the RFID tag within the area.

11. The method of claim 10 further comprising the step of assessing where to position the high weight guard tag with respect to the RFID tag in the area.

12. The method of claim 10, wherein at least one of the plurality of guard tags is a medium weight guard tag that is less than a weight of the plurality of guard tags.

13. The method of claim 12, further comprising the step of assessing where to position the medium weight guard tag with respect to the RFID tag in the area.

* * * * *